United States Patent [19]
Corrigan et al.

[11] Patent Number: 5,855,996
[45] Date of Patent: *Jan. 5, 1999

[54] ABRASIVE COMPACT WITH IMPROVED PROPERTIES

[75] Inventors: Francis Raymond Corrigan, Westerville; Henry Samuel Marek, Worthington, both of Ohio

[73] Assignee: General Electric Company, Pittsfield, Mass.

[*] Notice: This patent issued on a continued prosecution application filed under 37 CFR 1.53(d), and is subject to the twenty year patent term provisions of 35 U.S.C. 154(a)(2).

[21] Appl. No.: 571,312

[22] Filed: Dec. 12, 1995

[51] Int. Cl.$^6$ .................................................... C22C 26/00
[52] U.S. Cl. .......................... 428/212; 428/323; 428/408; 428/698; 51/307; 51/309
[58] Field of Search ...................................... 428/408, 698, 428/212, 323, 295; 51/307, 309

[56] References Cited

U.S. PATENT DOCUMENTS 4,311,490  1/1982  Bovenkerk et al. ....................... 51/307
5,106,392  4/1992  Slutz et al. ................................ 51/307

*Primary Examiner*—A. A. Turner

[57] ABSTRACT

Metal carbide supported polycrystalline diamond (PCD) compacts having improved abrasion/impact resistance properties and a method for making the same under high temperature/high pressure (HT/HP) processing conditions. The PCD compact is characterized as having a mixture of submicron sized diamond particles and large sized diamond particles.

10 Claims, 6 Drawing Sheets

ABRASIVE COMPACT WITH IMPROVED PROPERTIES

BACKGROUND OF THE INVENTION

The present invention relates to supported polycrystalline diamond (PCD) compacts made under high temperature/high pressure (HT/HP) processing conditions, and more particularly to supported PCD compacts having improved diamond to diamond particle bonding and increased diamond density in PCD compacts.

A compact may be characterized generally as an integrally-bonded structure formed of a sintered, polycrystalline mass of abrasive particles, such as diamond or CBN. Although such compacts may be self-bonded without the aid of a bonding matrix or second phase, it generally is preferred, as is discussed in U.S. Pat. Nos. 4,063,909 and 4,601,423, to employ a suitable bonding matrix which usually is a metal such as cobalt, iron, nickel, platinum, titanium, chromium, tantalum, or an alloy or mixture thereof. The bonding matrix, which is provided at from about 10% to 30% by volume, additionally may contain a recrystallization or growth catalyst such as aluminum for CBN or cobalt for diamond.

For many applications, it is preferred that the compact is supported by bonding it to substrate material to form a laminate or supported compact arrangement Typically, the substrate material is provided as a cemented metal carbide which comprises, for example, tungsten, titanium, or tantalum carbide particles, or a mixture thereof, which are bonded together with a binder of between about 6% to about 25% by weight of a metal such as cobalt, nickel, or iron, or a mixture or alloy thereof. As is shown, for example, in U.S. Pat. Nos. 3,381,428; 3,852,078; and 3,876,751, compacts and supported compacts have found acceptance in a variety of applications as parts or blanks for cutting and dressing tools, as drill bits, and as wear parts or surfaces.

The basic HT/HP method for manufacturing the polycrystalline compacts and supported compacts of the type herein involved entails the placing of an unsintered mass of abrasive, crystalline particles, such as diamond or CBN, or a mixture thereof, within a protectively shielded metal enclosure which is disposed within the reaction cell of a HT/HP apparatus of a type described further in U.S. Pat. Nos. 2,947,611; 2,941,241; 2,941,248; 3,609,818; 3,767,371; 4,289,503; 4,673,414; and 4,954,139. Additionally placed in the enclosure with the abrasive particles may be a metal catalyst if the sintering of diamond particles is contemplated, as well as a pre-formed mass of a cemented metal carbide for supporting the abrasive particles and to thereby form a supported compact therewith. The contents of the cell then are subjected to processing conditions selected as sufficient to effect intercrystalline bonding between adjacent grains of the abrasive particles and, optionally, the joining of the sintered particles to the cemented metal carbide support. Such processing conditions generally involve the imposition for about 3 to 120 minutes of a temperature of at least 1300° C. and a pressure of at least 20 kbar.

As to the sintering of polycrystalline diamond compacts or supported compacts, the catalyst metal may be provided in a pre-consolidated form disposed adjacent the crystal particles. For example, the metal catalyst may be configured as an annulus into which is received a cylinder of abrasive crystal particles, or as a disc which is disposed above or below the crystalline mass. Alternatively, the metal catalyst, or solvent as it is also known, may be provided in a powdered form and intermixed with the abrasive crystalline particles, or as a cemented metal carbide or carbide molding powder which may be cold pressed in to shape and wherein the cementing agent is provided as a catalyst or solvent for diamond recrystallization or growth. Typically, the metal catalyst or solvent is selected from cobalt, iron, or nickel, or an alloy or mixture thereof, but other metals such as ruthenium, rhodium, palladium, chromium, manganese, tantalum, and alloys and mixtures thereof also may be employed.

Under the specified HT/HP conditions, the metal catalyst, in whatever form provided, is caused to penetrate or "sweep" into the abrasive layer by means of either diffusion or capillary action, and is thereby made available as a catalyst or solvent for recrystallization or crystal intergrowth. The HT/HP conditions, which operate in the diamond stable thermodynamic region above the equilibrium between diamond and graphite phases, effect a compaction of the abrasive crystal particles which is characterized by intercrystalline diamond-to-diamond bonding wherein parts of each crystalline lattice are shared between adjacent crystal grains. Preferably, the diamond concentration in the compact or in the abrasive table of the supported compact is at least about 70% by volume. Methods for making diamond compacts and supported compacts are more fully described in U.S. Pat. Nos. 3,141,746; 3,745,623; 3,609,818; 3,850, 591; 4,394,170; 4,403,015; 4,797,326; and 4,954,139.

As to polycrystalline CBN compacts and supported compacts, such compacts and supported compacts are manufactured in general accordance with the methods suitable for diamond compacts. However, in the formation of CBN compacts via the previously described "sweep-through" method, the metal which is swept through the crystalline mass need not necessarily be a catalyst or solvent for CBN recrystallization. Accordingly, a polycrystalline mass of CBN may be joined to a cobalt-cemented tungsten carbide substrate by the sweep through of the cobalt from the substrate and into the interstices of the crystalline mass notwithstanding that cobalt is not a catalyst or solvent for the recrystallization of CBN. Rather, the interstitial cobalt functions as a binder between the polycrystalline CBN compact and the cemented tungsten carbide substrate.

As it was for diamond, the HT/HP sintering process for CBN is effected under conditions in which CBN is the thermodynamically stable phase. It is speculated that under these conditions, intercrystalline bonding between adjacent crystal grains also is effected. The CBN concentration in the compact or in the abrasive table of the supported compact is preferably at least about 50% by volume. Methods for making CBN compacts and supported compacts are more fully described in U.S. Pat. Nos. 2,947,617; 3,136,615; 3,233,988; 3,743,489; 3,745,623; 3,831,428; 3,918,219; 4,188,194; 4,289,503; 4,673,414; 4,797,326; and 4,954,139. Exemplary CBN compacts are disclosed in U.S. Pat. No. 3,767,371 to contain greater than about 70% by volume of CBN and less than about 30% by volume of a binder metal such as cobalt Such compacts are manufactured commercially by the General Electric Company under the name BZN 6000®.

As is described in U.S. Pat. No. 4,334,928, yet another form of a polycrystalline compact, which form need not necessarily exhibit direct or intercrystalline bonding, involves a polycrystalline mass of diamond or CBN particles having a second phase of a metal or alloy, a ceramic, or a mixture thereof. The second material phase is seen to function as a bonding agent for the abrasive crystal particles. Polycrystalline diamond and polycrystalline CBN compacts containing a second phase of a cemented carbide are exemplary of these "conjoint" or "composite" polycrystalline abrasive compacts. Such compacts may be considered to be "thermally-stable" as compared to metal-containing compacts as having service temperatures above about 700° C. Compacts as those described in U.S. Pat. No. 4,334,928 to comprise 80 to 10% by volume of CBN and 20 to 90% by volume of a nitride binder such as titanium nitride also may be considered exemplary of a thermally-stable material. Such CBN-TiN compacts are manufactured commercially by the General Electric company under the name BZN 8100®.

With respect to supported compacts, it is speculated, as is detailed in U.S. Pat. No. 4,797,326, that the bonding of the support to the polycrystalline abrasive mass involves a physical component in addition to a chemical component which develops at the bondline if the materials forming the respective layers are interactive. The physical component of bonding is seen to develop from the relatively lower CTE of the polycrystalline abrasive layer as compared to the cemented metal support layer. That is, upon the cooling of the supported compact blank from the HT/HP processing conditions to ambient conditions, it has been observed that the support layer retains residual tensile stresses which, in turn, exert a radial compressive loading on the polycrystalline compact supported thereon. This loading maintains the polycrystalline compact in compression which thereby improves fracture toughness, impact, and shear strength properties of the laminate.

In the commercial production of supported compacts it is common for the product or blank which is recovered from the reaction cell of the HT/HP apparatus to be subjected to a variety or finishing operations which include cutting, such as by electrode discharge machining or with lasers, milling, and especially grinding to remove any adherent shield metal from the outer surfaces of the compact Such finishing operations additionally are employed to machine the compact into a cylindrical shape or the like which meets product specifications as to diamond or CBN abrasive table thickness and/or carbide support thickness. Especially with respect to diamond and CBN supported compacts, a substantially uniform abrasive layer thickness is desirable since the abrasive tables on the blanks are often machined by the user into final products having somewhat elaborate configurations, e.g., sawtoothed wedges, which are tailored to fit particular applications. It will be appreciated, however, that during such finishing operations, the temperature of the blank, which previously had been exposed to a thermal cycle during its HT/HP processing and cooling to room temperature, can be elevated due to the thermal effects of grinding or cutting operations. Moreover, the blank or product finished therefrom may be mounted onto the steel shank of a variety of cutting or drilling tools using braze or solder techniques requiring temperatures of from about 750° to about 800° C. to melt the filler alloy. This again subjects the compacts and supports to thermal gradients and stresses. During each of the thermal cyclings of the supported blank, the carbide support, owing to its relatively higher coefficient of thermal expansion (CTE), will have expanded to a greater extent than the abrasive compact supported thereon. Upon heating and cooling, the stresses generated are relieved principally through the deformation of the abrasive table which may result in its stress cracking and in its delamination from its support.

To improve the bond strength at the interface between, particularly, PCD compacts and their cemented metal carbide supports, proposal have been made to interpose an intermediate layer between the PCD and carbide layers. As is detailed in U.S. Pat. Nos. 4,403,015 and 5,037,704, the intermediate layer is provided to contain less than about 70% by volume of CBN and a balance of a nitride such as TiN, and is sintered directly between the PCD and carbide layers using the traditional HT/HP method. The interposition of a CBN-TiN bonding layer has been observed to prevent the influx or "sweep" of the cobalt binder from the carbide layer to the PCD layer wherein it would have otherwise catalyzed the back-conversion of diamond to graphite hereby weakening the interface between the PCD and carbide layers.

As to supported PCD compacts, it is known in the art to use various size feed powder in forming sintered diamond compacts. However, using fine diamond particles alone usually causes unacceptable reduction of the high abrasion resistance. Using large diamond particles alone results in reduction of diamond density and diamond to diamond bonding. Since supported PCD compacts heretofore known in the art have garnered wide acceptance for use in cutting and dressing tools, drill bits, and the like, it will be appreciated that further improvements in the strength and impact properties of such materials would be well-received by industry. Especially desired would be supported diamond compacts having improved thermal stability, abrasion and wear resistance and impact resistance which would expand the applications for such material by enhancing their machinability, performance, and wear properties. Thus, there has been and heretofore has remained a need for supported PCD compacts having improved physical properties.

BROAD STATEMENT OF THE INVENTION

The present invention is directed to supported polycrystalline diamond (PCD) compacts made under high temperature/high pressure (HT/HP) processing conditions and to a method of making the same, and more particularly to supported PCD compacts having improved thermal stability, abrasion and wear resistance and impact resistance properties wherein fine size diamond particles are included in the feed mix for preparing diamond compacts. In utilizing particle size differential solubility/dissolution rate effects as the driving force in polycrystalline diamond sintering, the method of the invention results in supported PCD compacts having physical properties improved over conventional supported PCD compacts wherein the large or fine sized diamond particles are used alone. Moreover, the supported compacts of the present invention, in having significantly less void as evidenced in the photomicrographs, have been observed to exhibit shear strength and impact properties improved over the conventional supported compacts having one diamond particle size.

It therefore is a feature of the present invention to provide an improved metal carbide supported PCD compact. In accordance with the invention, a sintered PCD compact is provided to be bonded to a cemented metal carbide support layer comprising particles of a metal carbide in a binder metal. The PCD compact of the invention is characterized as having a mixture of relatively large sized diamond particles and fine diamond particles.

It is a further feature of the invention to provide a high pressure/high temperature (HP/HT) method for making a metal carbide supported polycrystalline diamond (PCD) compact In accordance with the method of the invention, a reaction cell assembly is provided to comprise: a mass of diamond particles of various sizes and a cemented metal carbide support layer disposed adjacent the mass of diamond particles; the cemented metal carbide support layer comprising particles of a metal carbide in a binder metal. The reaction cell assembly provided then is subjected to HT/HP conditions selected as being effective to sinter the mass of diamond particles into a PCD compact layer and to bond the PCD compact layer to the cemented metal carbide support layer by effecting a substantially uniform sweep of the binder metal from the cemented metal carbide support layer through the mass of diamond particles.

Advantages of the present invention include the provision of high performance supported PCD blanks which have increased diamond content and increased diamond bonding in the PCD compacts. Accordingly, such blanks would be highly desired for cutting, drilling and other applications. Additional advantages of the present invention include supported blanks having improved bond strengths between the abrasive table and the support leading to higher service temperatures and facilitating machining, brazing, or other finishing processes in conformance with product specifications with a reduced risk of stress cracking, delamination, or the like. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1A:
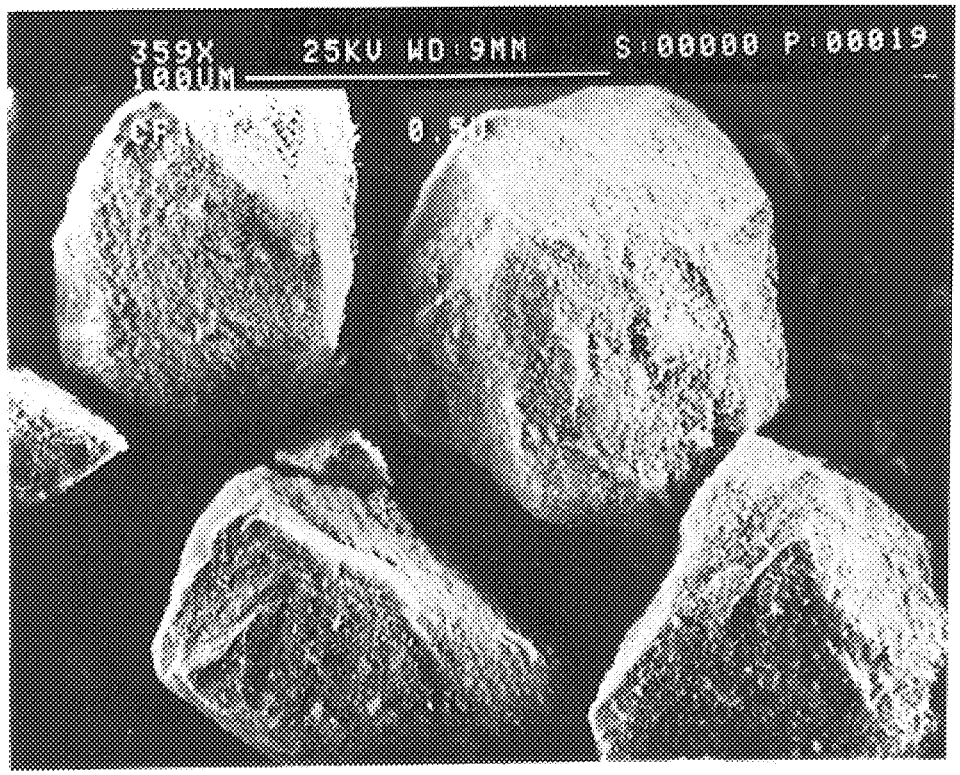
FIGS. 1A and 1B are photomicrographs of a sintered PCD compact made of a mixture of 15% diamond particles having an average particle size of 0.5 micron and 85% diamond particles having particle sizes ranging from 57 to 97 microns with a mean particle size of about 70 microns.
Figure 1B:
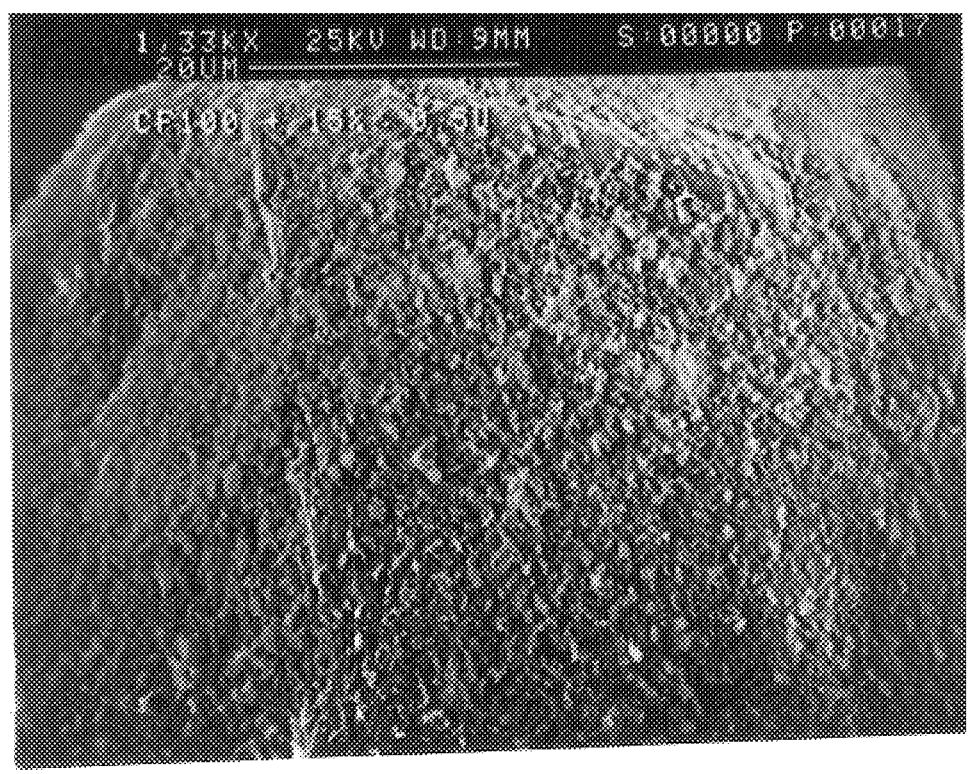
Figure 1C:
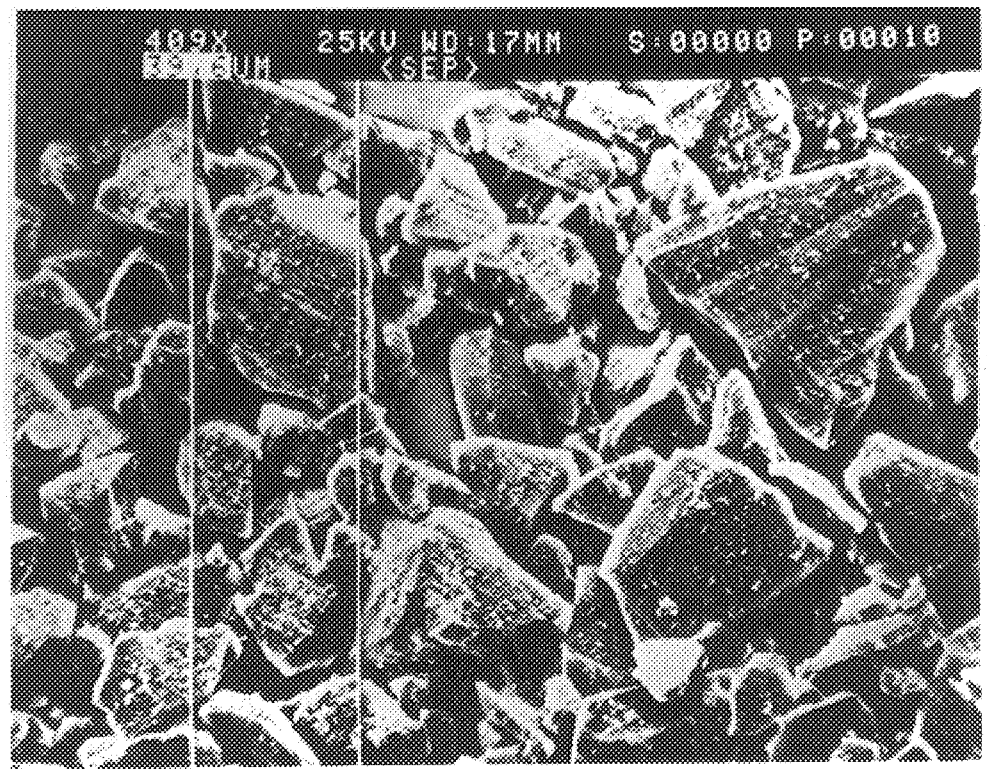
FIGS. 1C, 2B, 3B and 4B are photomicrographs of a sintered PCD compact made of a mixture of 5% diamond particles having an average particle size of 0.5 micron and 95% diamond particles having particle sizes ranging from 10 to 45 microns with a mean particle size of about 28 microns.
Figure 2A:
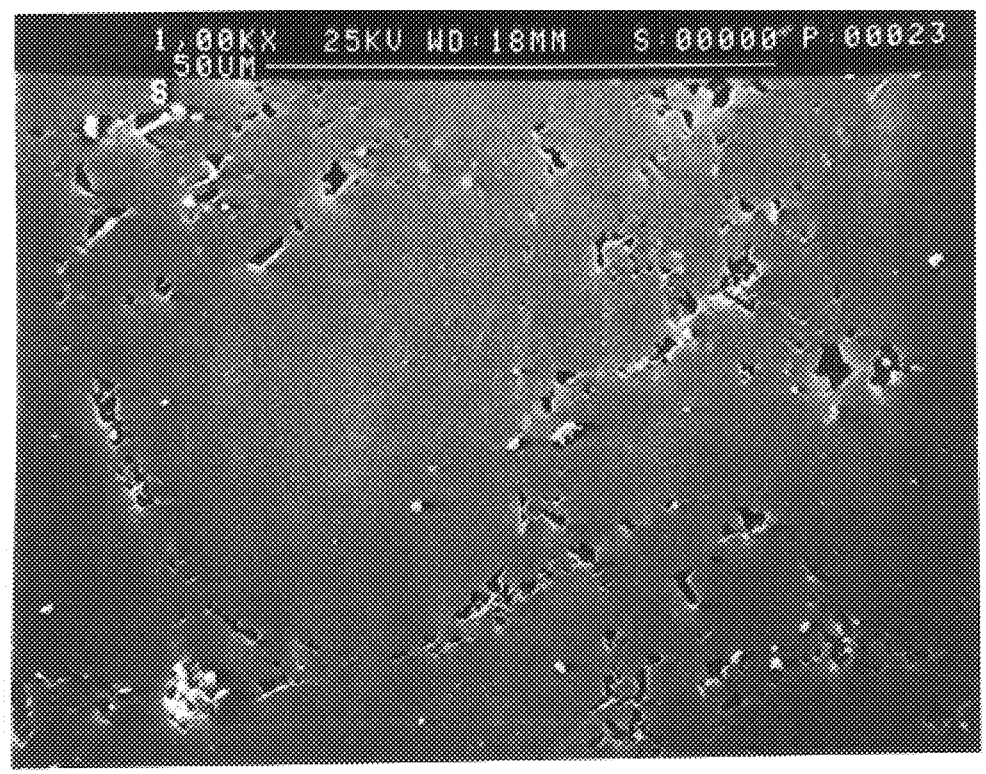
FIGS. 2A, 3A and 4A are photomicrographs of a sintered PCD compact made of 100% diamond particles having particle sizes ranging from 10 to 45 micron with a mean particle size of about 28 microns.
Figure 2B:
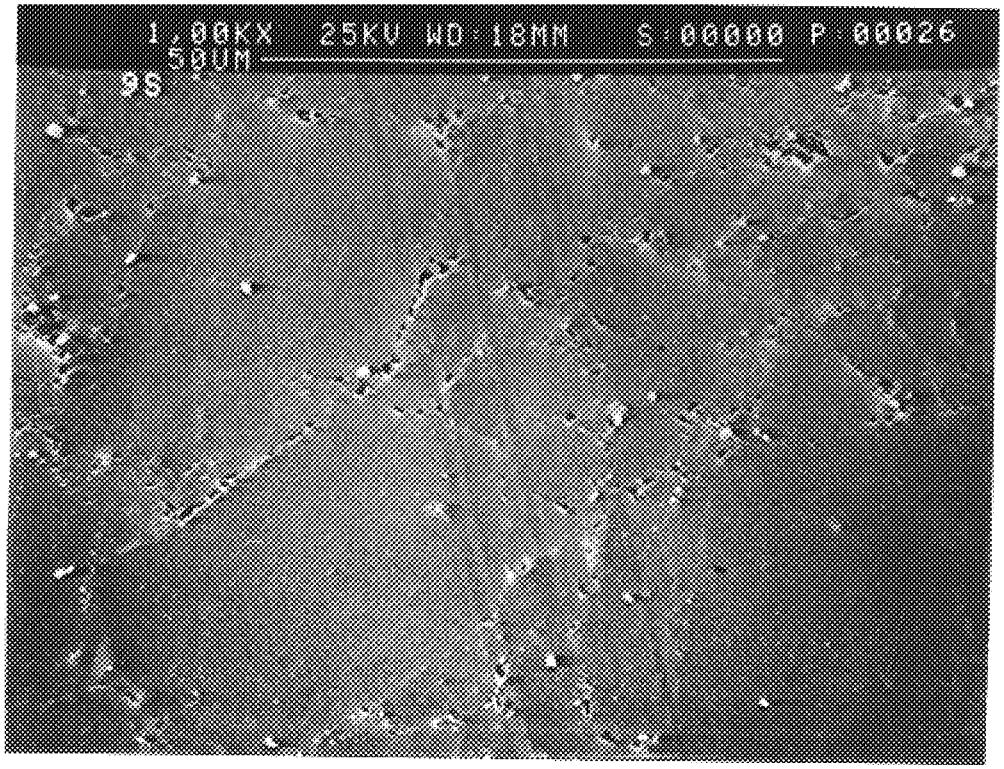
Figure 2C:
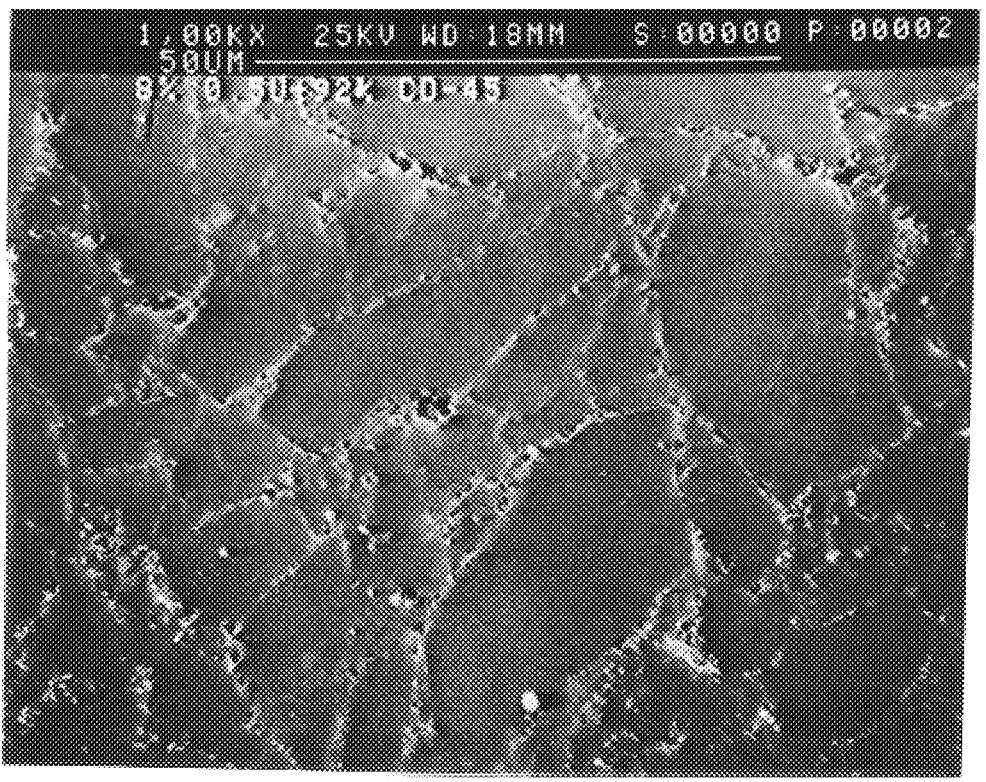
FIGS. 2C, 3C and 4C are photomicrographs of a sintered PCD compact made of a mixture of 8% diamond particles having an average particle size of 0.5 micron and 92% diamond particles having particle sizes ranging from 10 to 45 micron with a mean particle size of about 28 microns.
Figure 3A:
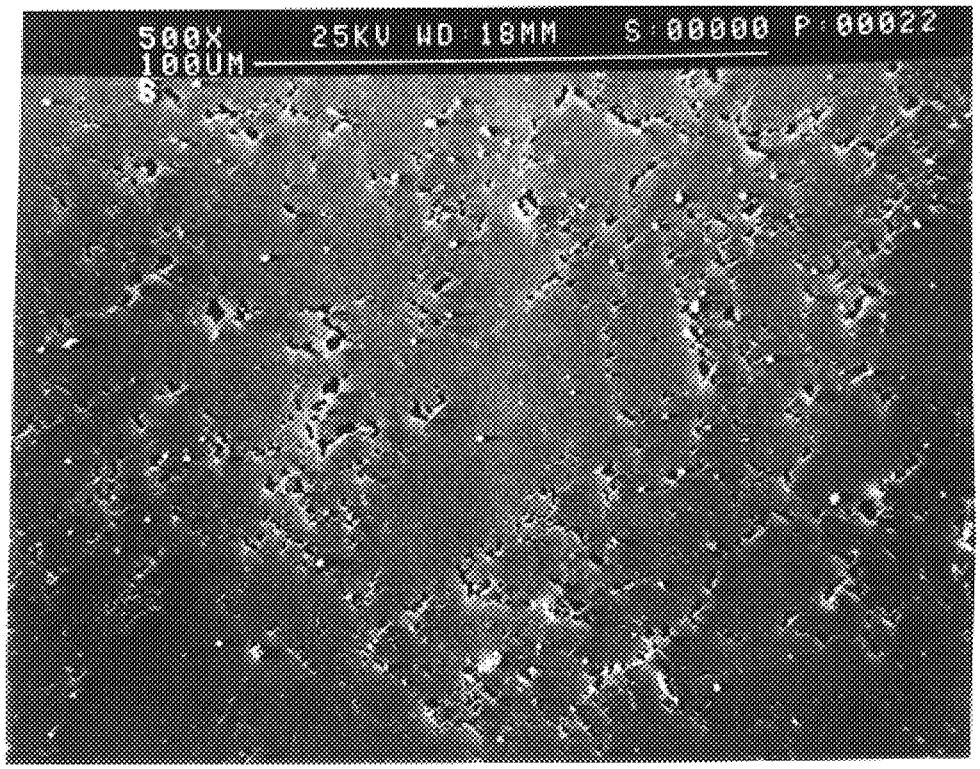
Figure 3B:
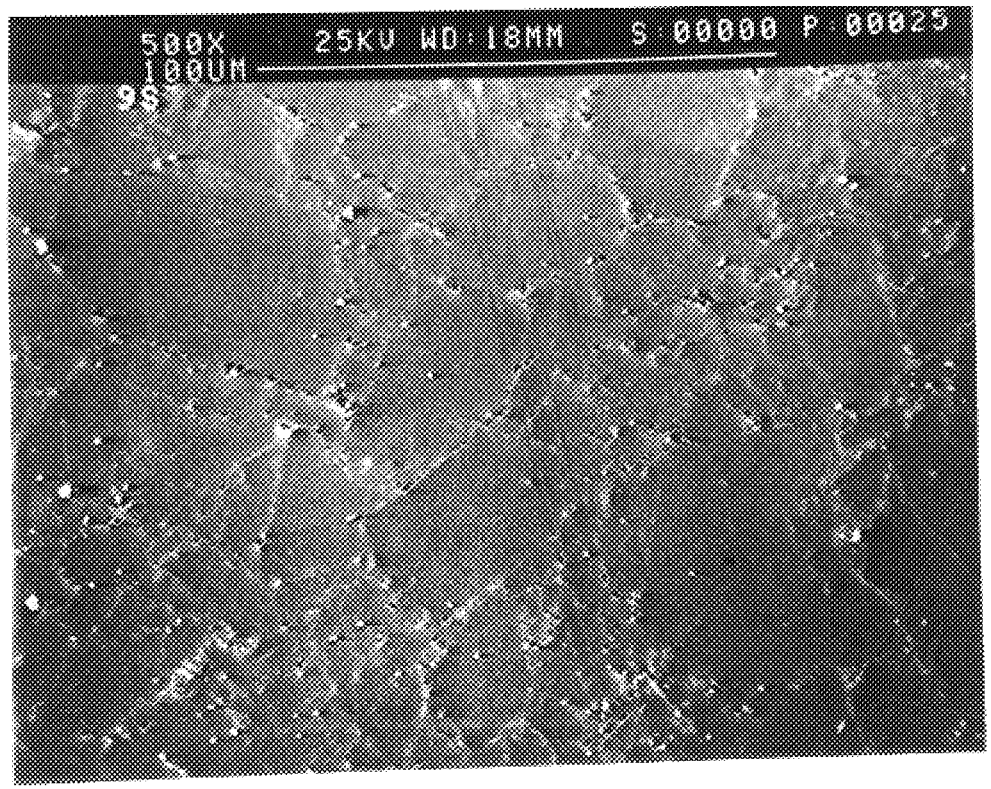
Figure 3C:
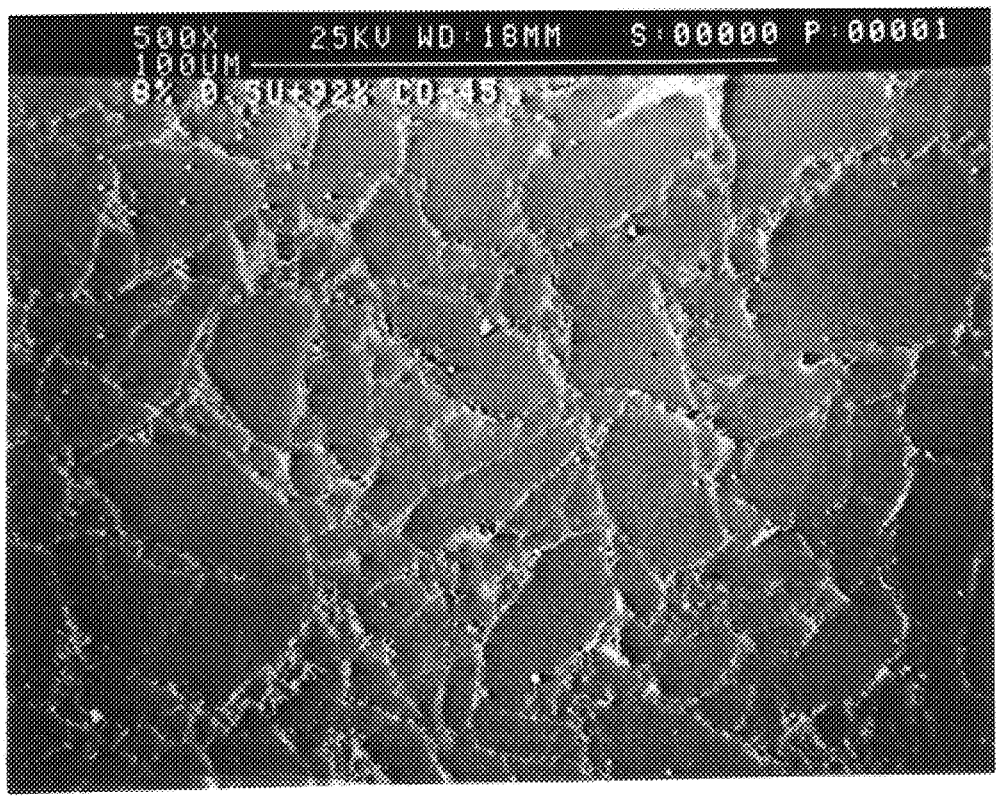
Figure 4A:
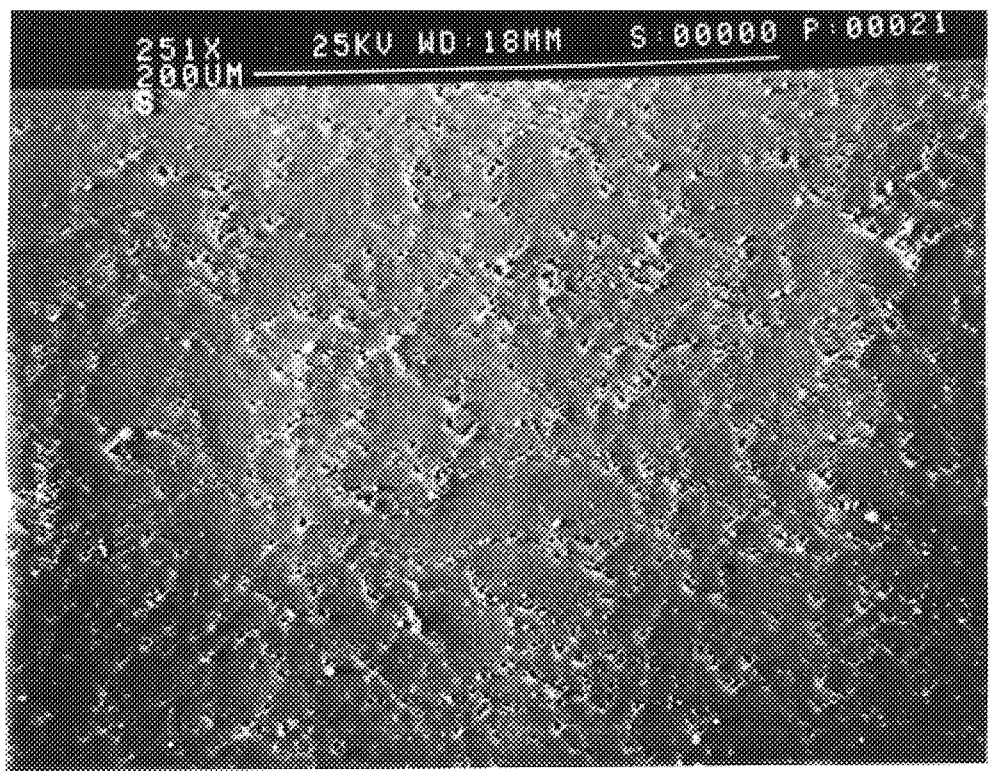
Figure 4B:
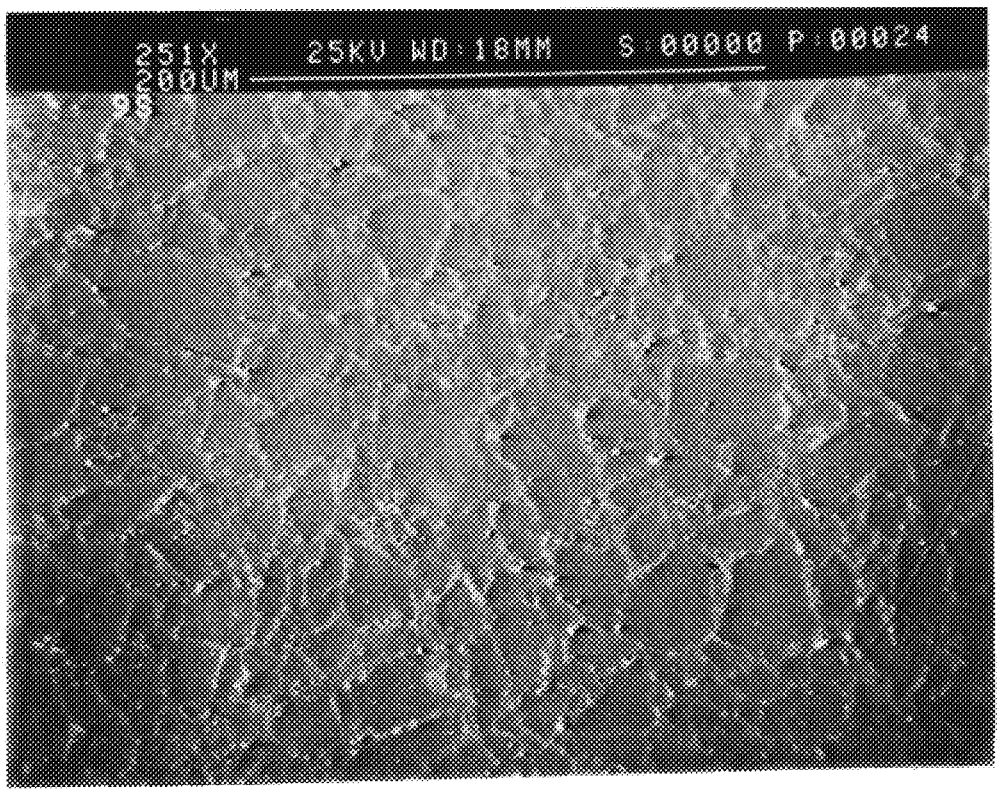
Figure 4C:
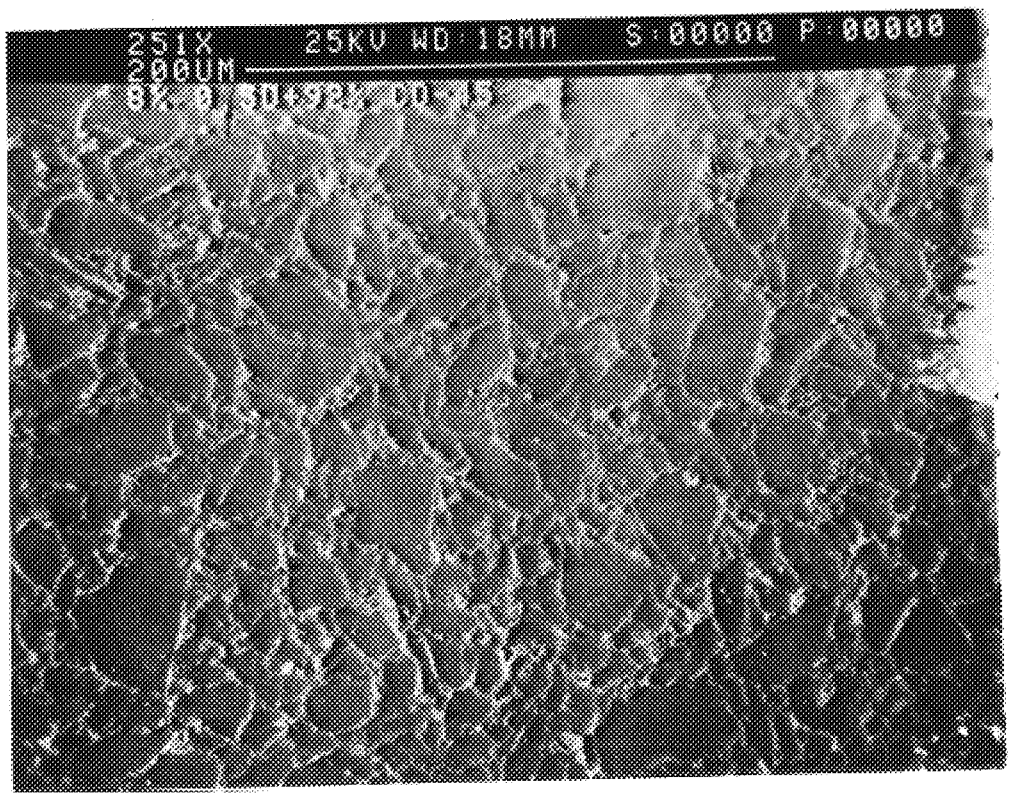

The drawings will be described further in connection with the following Detailed Description of the Invention.

DETAILED DESCRIPTION OF THE INVENTION

A metal carbide supported PCD diamond compact according to the present invention comprises a sintered PCD compact layer bonded to a cemented metal carbide support layer. Preferably, the PCD compact layer is provided as a powdered mass of diamond particles having a mixture of relatively large sized diamond particles dispersed in fine sized diamond particles. The large sized diamond particles range from about 5 to about 100 microns, preferably from about 10 to about 100 microns, and most preferably from about 10 to about 45 microns. The fine sized diamond particles range from about 0.01 to about 1 micron, preferably from about 0.05 to about 1 micron, and most preferably from about 0.1 to about 1 micron. The fine sized diamond component ranged from 2 to 15 weight percent of the total diamond particles, preferably from 2 to 8% and most preferably from 4 to 8%.

Broadly, cemented metal carbide support layer is selected as comprising particles of a metal carbide, such as tungsten carbide, titanium carbide, tantalum carbide, and molybdenum carbide, and mixtures thereof, held within a metal binder, such as cobalt, nickel, and iron, or a mixture or an alloy thereof, which is provided at about 6% to 25% by weight. For effecting the sintering of the diamond particles into the PCD compact layer, however, it is preferred that the binder metal is provided as a diamond catalyst or solvent such as cobalt, iron, nickel, ruthenium, rhodium, palladium, platinum, chromium, manganese, tantalum, osmium, iridium, or a mixture or alloy thereof, with cobalt or a cobalt alloy or mixture being favored for performance and processing considerations.

By "bonded," it is meant that the PCD compact layer and the metal carbide support layer are directly joined chemically and/or physically to an adjacent layer under the HT/HP processing conditions without means of a braze alloy filler layer under the HT/HP processing or the like. By "solubility" it is meant that concentration of carbon solute which can be contained in the cobalt solvent in the presence of the diamond particles being dissolved.

The reaction cell, once charged with the PCD layer and carbide layers, then may be placed as a reaction cell assembly between the punches of the HT/HP apparatus. Alternatively, the cell may be charged into the HT/HP apparatus as one of a number of subassembly cells provided in a stacked, axially-aligned arrangement for preparing a plurality of compacts. Under the HT/HP conditions achieved within the HT/HP apparatus, the binder metal from the support layer is made to advance or "sweep" by diffusion or capillary action through the PCD powder layer wherein it is made available as a catalyst or solvent for the recrystallization or crystal intergrowth of the diamond particles for forming the PCD compact layer. To promote a uniform sweep through of the layers forming compact, additional diamond catalyst or solvent metal may be admixed with or provided in a separate layer disposed adjacent to the powdered diamond particles forming the PCD compact layer. In general, the HT/HP conditions are applied to the reaction cell assembly for a time sufficient to effect the sintering or intercrystalline direct bonding of the diamond particles forming the compact layer into integral abrasive bodies or polycrystalline compacts which are essentially free of voids, and to effect the direct bonding of these compacts to adjacent layers. Advantageously, the direct bonding relationship between the layers forming the compact obviates the need for the interposition of an additional bonding layer therebetween, as would result from the brazing or soldering of the layers to their adjacent layers. Broadly, the HT/HP conditions under which the HT/HP apparatus is made to operate are selected as being within the thermodynamic region wherein diamond and is the stable phase, and whereat significant reconversion, i.e., graphitization, of the crystalline diamond does not occur. In this regard, the apparatus is operated at a temperature of at least about a 1000° C., but preferably from between about 1000° C. to about 2000° C., and at a pressure of at least about 30 kbar, but preferably from between about 40 to about 80 kbars. It should be noted, however, that the preferred temperatures and pressures specified herein are estimates only due to the difficulties attending the accurate and precise measurement of the high temperatures and pressures necessary for diamond processing. In addition, the pressure and temperature values specified need not remain constant during processing, but may be varied to define predetermined heating, cooling, and/or pressure schedules. It is known that such variances may affect the ultimate physical properties of the resulting product.

The Examples to follow, wherein all percentages and proportions are by weight unless otherwise expressly indicated, are illustrative of the practicing of the invention herein involved, but should not be construed in any limiting sense.

EXAMPLES

The following two mixes of submicron size powder were prepared by wet ball milling using an alcohol vehicle:

Mix A: 15% submicron/85% CF100

Mix B: 2% submicron/98% CF45

Mix C: 5% submicron/95% CF45

Mix D: 8% submicron/92% CF45

The submicron size powder has an average particle size of 0.5 micron. CF100 have particle sizes ranging from 57 to 97 microns with a mean particle size of about 70 microns. CF45 have particle sizes ranging from 10 to 45 microns with a mean particle size of about 28 microns.

Comparison of the microstructure at all three magnifications clearly demonstrates a higher degree of porosity (due to leaching out of the metallic phase) in the standard CF45 sample compared to the 5% and 8% submicron mixed samples. Thus the 5% and 8% submicron mixed samples have high diamond density and improved bonding.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed:

1. A metal carbide supported polycrystalline diamond (PCD) compact comprising:

a sintered PCD compact layer; and a cemented metal carbide support layer bonded to said PCD compact layer, said cemented metal carbide support layer comprising particles of a metal carbide;

wherein said sintered PCD compact layer is characterized as having a mixture of submicron sized diamond particles having particle sizes ranging from about 0.01 to about 1 micron and large sized diamond particles having particle sizes ranging from about 6 to about 100 microns; and wherein said sintered PCD compact layer comprises from about 2 to about 15 weight percent submicron sized diamond particles.

2. The metal carbide supported PCD compact of claim 1 wherein said metal carbide of said cemented metal carbide support layer is selected from the group consisting of tungsten carbide, titanium carbide, tantalum carbide, and molybdenum carbide, and mixtures thereof.

3. The metal carbide supported PCD compact of claim 1 wherein said cemented metal carbide support further comprises a binder metal selected from the group consisting of cobalt, nickel, iron, ruthenium, rhodium, palladium, platinum, chromium, manganese, tantalum, osmium, and iridium, and mixtures and alloys thereof.

4. The metal carbide supported PCD compact of claim 3 wherein said cemented metal carbide support layer comprises between about 6% to 25% by weight of said binder metal.

5. The metal carbide supported PCD compact of claim 1, wherein said subrnicron sized diamond particles have particle sizes ranging from about 0.05 to about 1 micron.

6. The metal carbide supported PCD compact of claim 5, wherein said submicron sized diamond particles have particle sizes ranging from about 0.1 to about 1 micron.

7. The metal carbide supported PCD compact of 1, wherein the large sized diamond particles have particle sizes ranging from about 10 to about 100 microns.

8. The metal carbide supported PCD compact of claim 7, wherein the large sized diamond particles have particle sizes ranging from about 40 to about 100 microns.

9. The metal carbide supported PCD compact of claim 1, wherein said sintered PCD compact layer comprises from about 2 to about 8 weight percent submicron sized diamond particles.

10. The metal carbide supported PCD compact of claim 9, wherein said sintered PCD compact layer comprises from about 4 to about 8 weight percent submicron sized diamond particles.

* * * * *